(12) United States Patent
Zulian et al.

(10) Patent No.: US 6,314,484 B1
(45) Date of Patent: Nov. 6, 2001

(54) COMPUTER SYSTEM WITH A BUS HAVING A SEGMENTED STRUCTURE

(75) Inventors: Ferruccio Zulian; Aimone Zulian, both of Milan (IT)

(73) Assignee: Bull HN Information Systems Italia S.p.A., Milan (IT)

( * ) Notice: Subject to any disclaimer, the term of this patent is extended or adjusted under 35 U.S.C. 154(b) by 0 days.

(21) Appl. No.: 09/112,520

(22) Filed: Jul. 9, 1998

(51) Int. Cl.[7] .............................. G06F 13/38; G06F 13/40
(52) U.S. Cl. ............................................. 710/126; 710/241
(58) Field of Search ................................. 710/107, 126, 710/127, 129, 130, 240, 241

(56) References Cited

U.S. PATENT DOCUMENTS

| | | | | |
|---|---|---|---|---|
| 4,604,683 | * | 8/1986 | Russ et al. ............................ | 710/100 |
| 5,440,698 | * | 8/1995 | Sindhu et al. ........................ | 709/225 |
| 5,511,224 | * | 4/1996 | Tran et al. ............................ | 710/107 |
| 5,528,765 | * | 6/1996 | Milligan ................................ | 710/128 |
| 5,809,533 | * | 9/1998 | Tran et al. ............................ | 710/128 |
| 5,887,146 | * | 3/1999 | Baxter et al. ........................ | 710/104 |
| 5,915,101 | * | 6/1999 | Kleineberg et al. ................. | 710/107 |
| 6,002,675 | * | 12/1999 | Ben-Michael et al. ............. | 370/315 |

FOREIGN PATENT DOCUMENTS

| | | | |
|---|---|---|---|
| 4000673 | 7/1991 | (DE) | ............................ G06F/13/40 |
| 0446039 | 9/1991 | (EP) | ............................ G06F/13/40 |
| 9106021 | 6/1984 | (JP) | ............................. G06F/3/00 |
| 408095903A | * 4/1996 | (JP) | ............................ G06F/13/36 |
| 8095903 | 4/1996 | (JP) | ............................ G06F/13/36 |
| 8404185 | 10/1984 | (WO) | ............................. G06F/3/00 |

OTHER PUBLICATIONS

European Search Report, Feb. 12, 1998.

* cited by examiner

*Primary Examiner*—Xuan M. Thai
(74) *Attorney, Agent, or Firm*—Sofer & Haroun, LLP

(57) ABSTRACT

Computer system comprising a communication bus, a plurality of units connected to the bus, in which the bus includes a plurality of bus segments, each bus segment being concatenated with at least one adjacent bus portion by means of buffer registers to transfer a data item from the adjacent bus segment to the bus portion, the computer system further comprising an arbitration unit to control, for each bus segment, the simultaneous access to the different segments, in a mutually exclusive way, by the units connected to each of the segments and by the buffers for concatenation of each of the segments with at least one adjacent segment.

20 Claims, 3 Drawing Sheets

COMPUTER SYSTEM WITH A BUS HAVING A SEGMENTED STRUCTURE

TECHNICAL FIELD

The present invention relates to a computer system, and in particular to a computer system with a segmented bus.

BACKGROUND OF THE INVENTION

The architecture of a computer system typically comprises a bus structure consisting of a plurality of transmission lines to which various units are connected in parallel. In a computer system which includes a large number of units, as in a multi-processor system for example, the physical length of the bus becomes rather large. A disadvantage of this structure consists in the fact that the length of the bus increases the signal propagation time; this reduces the operating frequency of the bus, since the duration of an operating cycle is inevitably greater than this propagation time. Furthermore, since the same data item is distributed simultaneously to all the units connected to the bus, the structure is affected by the electrical load (input impedance) introduced by these units; this makes it necessary to use driver circuits with relatively high power and consequently high consumption, and creates a non-uniform distribution of the electrical load which may give rise to phenomena of reflection. The bus therefore has a low transfer rate, which has a marked effect on the performance of the whole computer system.

A further disadvantage is manifested in the case in which the bus (known as the remote bus) is used to connect nodes which comprise different units interconnected by means of a further bus (called the local bus).

The nodes are connected to the system or remote bus by a device which acts as a bridge between the local bus and the remote bus.

Each node corresponds to a single load (that of the bridge) connected to the remote bus.

In this way it is possible to reduce the number of loads connected to the bus and to improve its performance.

However, the remote bus generally has a greater length than the local buses, and therefore its operating speed is lower; this means that whenever a node accesses the remote bus it is necessary to introduce a latency period of a few operating cycles of the local bus.

SUMMARY OF THE INVENTION

The object of the present invention is to overcome the aforesaid disadvantages.

Essentially, the system bus, or remote bus, is divided into a plurality of segments of reduced length, linked in series and interconnected by pairs of buffer registers which transfer data from one bus segment to those immediately adjacent, in one or other of the two possible directions (for this purpose, the inter-connection between two segments is provided by pairs of buffers, one for the transfer of data in one direction, and the other for the transfer in the opposite direction).

The buffers are controlled by an arbitration unit, timed by a periodic clock signal, to store the data present in one bus segment in one period of the clock signal, with the leading edge of the clock signal which terminates the period and starts the next, and to transfer the data thus stored to the adjacent bus segment with the same leading edge of the clock signal.

It is thus evident that at least N−1 periods of the clock signal are required to transfer a data item along N concatenated bus segments.

However, it is evident that up to N different data items may pass simultaneously through the different segments of the bus in both directions, with a substantial increase in the transfer rate.

The arbitration unit, using suitable arbitration algorithms, determines the order in which the different data items are transferred from one segment to another in such a way as to provide the best possible transfer rate in different circumstances.

BRIEF DESCRIPTION OF THE DRAWINGS

These and further characteristics and advantages of the computer system according to the present invention are made clear by the following description of a preferred embodiment of the invention, supplied for guidance and without restriction, with reference to the attached figures, in which.

DETAILED DESCRIPTION OF THE PREFERRED EMBODIMENT

Figure 1:
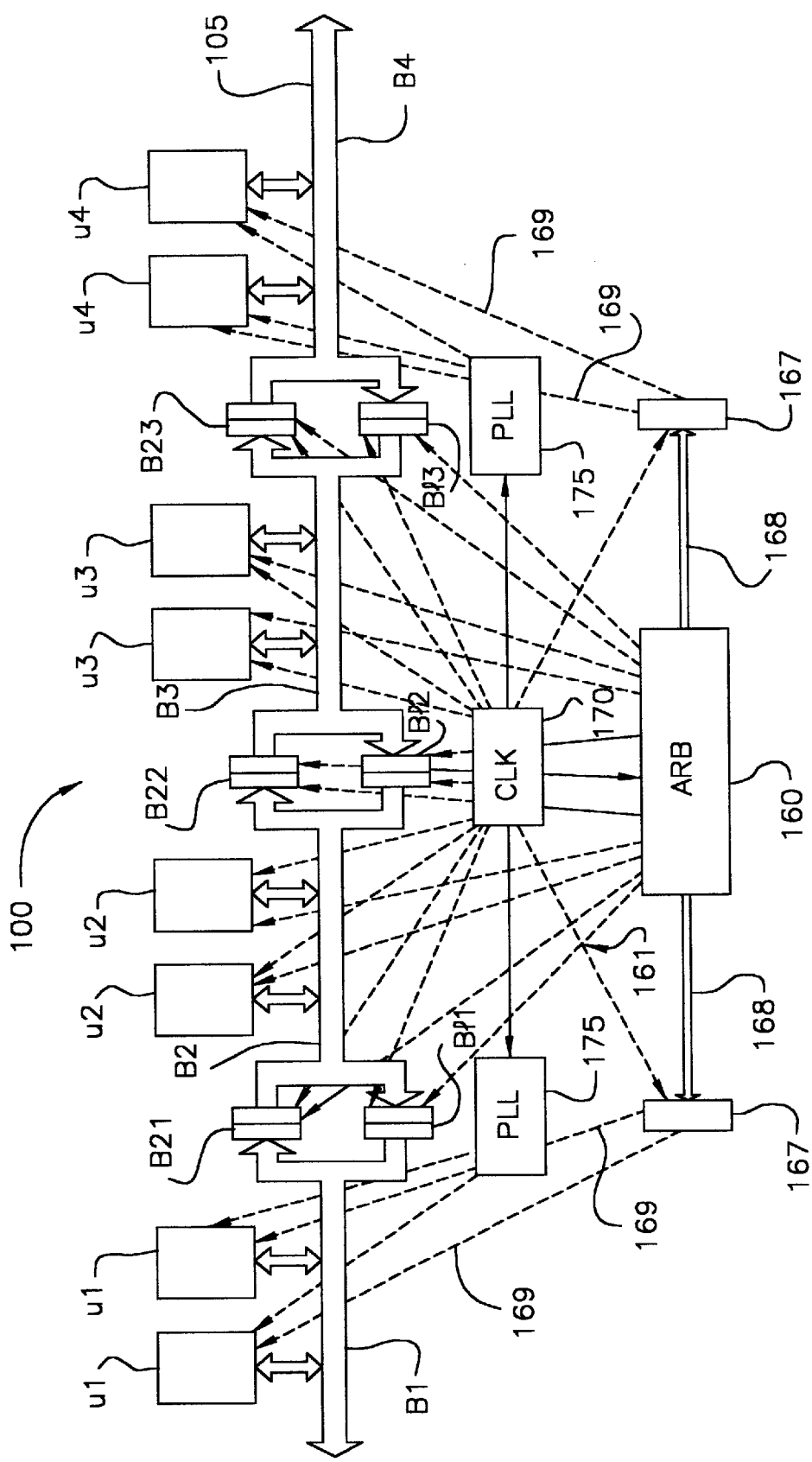
FIG. 1 is a block diagram of the computer system according to the present invention.

With particular reference to FIG. 1, a computer system 100 includes a multi-point bus structure 105 for the transmission of a data item (a value, an address or a command) consisting of one or more binary digits (or "bits"), to which various units U1–U4 are connected in parallel. The bus 105 is of the synchronous type, in which the time intervals of occupation of the bus 105 have a predetermined duration determined by the period of a clock signal. The computer system 100 is a multi-processor system, in which the bus 105 is a remote bus and in which one or more of the units U1–U4 consists of an interface unit (bridge) for connection with a local bus (not shown in the figure); the local bus is connected to one or more computing units or processors and other units (for example, a memory of the cache type, a local memory, an input/output channel, and similar) which form a node (or cluster). However, the present invention is also suitable for use in different structures, for example in a computer system without local buses, in a single-processor system, and similar.

According to the present invention, the bus 105 of the computer system 100 has a segmented structure and is divided into a plurality n (where n≧2) of segments B1–B4 (four in the present example); each bus segment B(i) (where i=1 . . . n) is connected to a variable number (which at one extreme may be zero) of corresponding units U(i).

If more than one unit is connected to one bus segment, a local arbitration unit, not illustrated, ensures that only one unit can request access to the segment at any time. The different units connected to the same bus segment can therefore be considered as a single unit.

The bus segments B1–B4 are concatenated by means of memory elements which operate as impedance separators, or buffers, in such a way that they electrically decouple the adjacent bus portions B1–B4. Each bus segment B(i) (with the exception of the first at the left-hand end of the series) is connected, at its left-hand end, to a rightward-passing buffer (more briefly, a "right buffer") Br(i−1) which receives a data item from a preceding bus segment B(i−1), stores it and subsequently transfers it to the bus segment B(i); it is also connected to a leftward-passing buffer (more briefly, a "left buffer") Bl(i) which receives a data item from a following bus portion B(i+1), stores it and subsequently transfers it to the bus portion B(i).

The other end of each bus segment (with the exception of the final right-hand segment of the series) is connected to a rightward-passing buffer Br(i) which receives a data item from the segment, stores it and subsequently transfers it to the bus segment B(i+1), and is also connected to a leftward-passing buffer Bl(i) which receives a data item from the following segment B(i+1), stores it and subsequently transfers it to the segment B(i).

As stated previously, the two end segments of the series, each of which is connected to a buffer register at one end only, constitute an exception.

The present invention is, however, also suitable for application to a ring bus, in which the first and last segments of the bus are interconnected by means of a further left buffer and a further right buffer. Preferably, each right buffer Br1–Br3 includes a bank of registers of the FIFO (First In First Out) type.

Each bank consists of two or more ordered registers. The various registers are controlled by means of a suitable control circuit in such a way that the data are loaded into the first free register in the order in the bank or into the one which is about to become free.

The present invention is, however, also suitable for application to different memory structures, such as a single register, and similar.

The computer system 100 also includes a central arbitration unit (ARB) 160 to control access, for each bus segment B(i), to transfer a data item to this bus segment B(i) from the connected units U(i), the corresponding right buffer Br(i−1) and the left buffer Bl(i) in a mutually exclusive way; the arbitration unit 160 also controls the loading of the data item present in the bus segment B(i) into the left buffer Bl(i−1) and into the right buffer Br(i). The arbitration unit 160 is connected to each unit U1–U4 and to each of the buffers Br1–Br3, B11–B13 to send a corresponding signal enabling access to the bus segments.

Preferably, the connection to the units U2, U3 and to the buffers Br1–Br3, B11–B13 disposed near the arbitration unit 160 is made directly by means of a dedicated line 161. However, the connection to the more remote units U1 and U4, for which the propagation time of these signals and consequently their time dispersion is greater, is made by using an intermediate register (buffer) 167, timed by a clock signal CLK; in particular, a dedicated line 168 is used to send the enabling signals to the buffers 167, where these signals are stored and subsequently transmitted to the units U1, U4 by means of a further dedicated line 169. Consequently the transmission of the enabling signals from the arbitration unit 160 to the units U1 and U4 requires two clock periods, but reduces the dispersion of the propagation times. With this embodiment it is possible to keep the clock period shorter and therefore to keep the operating frequency of the bus 105 higher. Similar considerations apply in the case in which two or more intermediate buffers are provided for the connection of the arbitration unit to the more remote units and buffers.

The clock signal for timing the computer system 100 is generated by a timer unit (CLK) 170. The clock signal is distributed directly to the arbitration unit 160, to the intermediate buffers 167, to the units U2–U3 and to the buffers Br1–Br3, B11–B13 disposed near the timer unit 170, in such a way as to ensure its synchronous reception by the various timed units and buffers.

Preferably, the said clock signal is also sent to a phase-locked loop (or PLL) 175, or to other equivalent devices, which regenerates the clock signal locally in such a way as to synchronize it with the signal produced by the timer unit 170. The clock signal synchronized by the phase-locked loop 175 is then distributed to the units U1 and U4. The clock signal is thus in phase at the various points in space of the computer system 100. Similar considerations are applicable in the case in which further PLLs in cascade connection are provided to distribute the clock signal to units and buffers more remote from the timer unit 170.

Figure 2:
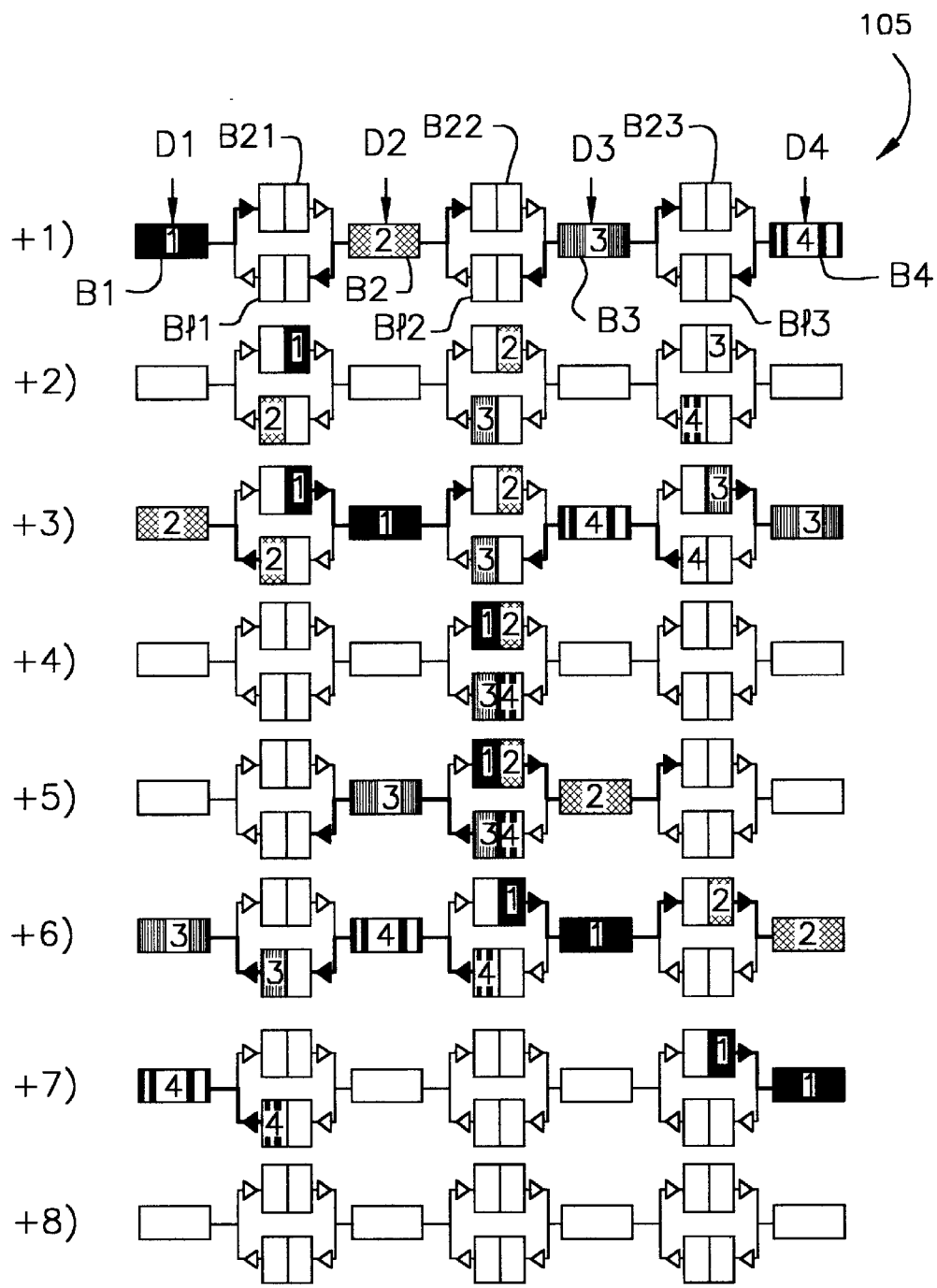
FIG. 2 shows an example in the form of a time diagram of the data transfer in the computer system according to the present invention.

To describe the operation of the computer system described above, reference will be made to the time diagram of an example of data transfer in FIG. 2 (the elements previously shown in FIG. 1 are identified by the same reference numbers or symbols). We shall consider an initial situation at the instant t1 in which one unit U(i) for each bus segment B(i) requests access to the bus 105 to transfer a data item Di. Each unit U(i) simultaneously accesses the corresponding bus segment B(i) to which the data item Di is transferred. At the same time, the access paths shown in bold lines are enabled, so that, at the leading edge of the clock signal at a subsequent instant t2, the data item D1 is loaded into the buffer Br1, the data item D2 is loaded into buffers B11 and Br2, the data item D3 is loaded into buffers B12 and B13, and the data item D4 is loaded into the buffer B13. During the clock period t2 there is no access to the bus segments B1–B4, since, to avoid transitory problems of contention during the changeover from access by one agent (connected units Ui or transfer buffers Bri, Bli) to access by another different agent, with possible interference between the signals sent by different agents, it is necessary to separate such write accesses by at least one intermediate recovery cycle. If we now consider an instant t3, the accesses shown in bold lines are enabled, so that the data item D2 is transferred to the bus segment B1, the data item D1 is transferred to the bus segment B2, the data item D4 is transferred to the bus segment B3 and the data item D3 is transferred to the bus segment B4; at the same time, the command is given for the reading and loading (shown in bold lines) of the buffers Br2 and B12, in which the data items D1 and D4 respectively are therefore loaded (at the leading edge of the clock signal at a subsequent instant t4). During the clock period t4, there is no access to the bus segments B1–B4; this enables the bus to be recovered. Similarly, at the instant t5 the data item D3 is transferred to the bus segment B2 and the data item D2 is transferred to the bus segment B3; the loading of the buffers B11, Br3, in which the data items D3 and D2 respectively are loaded (at the leading edge at an instant t6), is also enabled. During the same clock period t6, the data item D3 is transferred to the bus segment B1, the data item D4 is transferred to the bus segment B2, the data item D1 is transferred to the bus segment B3 and the data item D2 is transferred to the bus segment B4; it should be noted that, in this case, no bus recovery cycle is necessary, since access to the bus segments B1–B4 is granted to the same agents. At the same time, the reading by the buffers B11 and Br3, in which the data items D4 and D1 respectively are loaded (at the leading edge at an instant t7), is also enabled. During the same clock period t7 (without any recovery cycle) the data items D1 and D4 are therefore transferred to the bus segments B4 and B1 correspondingly and the data transfer terminates at the instant t8 at which the bus 105 becomes free again.

It may be noted from the example described above that each individual data transfer operation on the bus 105 requires a greater number of periods of the clock signal for the transfer of the data item between the various bus segments.

However, the clock signal frequency may be increased by comparison with that of a conventional non-segmented bus, so that the latency period, although variable, has a mean value equal to that of a conventional bus of equal length.

The structure according to the present invention also enables a multiplicity of accesses to the bus 105 to be controlled simultaneously and enables faster bus segments to be used, which also reduces the waiting cycles of any local buses. For example, let us consider a remote bus with a length of 1.5 m with a frequency of 25 MHz to which local buses with an operating frequency of 100 MHz are connected; in this situation, at least 3 waiting cycles on the local bus are required for each access to the remote bus. In the structure described above, however, four remote bus segments with a length of 40 cm each and a frequency of 100 MHz are used, so that the speed of each segment of the remote bus is four times greater and no waiting cycle is necessary (or at least a lower number of waiting cycles is necessary) in the local bus.

For greater clarity, it may be noted that if it is always the same agent that is obtaining access to one bus segment, without conflict with other agents, the data are propagated in "pipeline" mode along the bus with an access frequency which is reduced only if different agents request and obtain access to the bus segments, thereby entering into competition with one another.

Additionally, if it is always the same agent that obtains access to one bus segment, there is no risk of contention between the signals present in the segment in successive periods and there is no need to separate the consecutive accesses by a recovery period.

The computer system according to the present invention therefore has a higher overall operating speed; moreover, this result is obtained with a particularly compact and simple structure.

We may now consider the criteria according to which the arbitration unit ARB 160 grants access to the bus segments by a plurality of competing agents, in such a way that the data flow through the various bus segments is optimized.

For the sake of clarity, it will be useful to proceed in steps.
General Criteria Although the external agents which submit requests for access to the system bus are only the processors connected to the different segments of the bus (and, if there is more than one processor for each segment, these are treated as a single processor as a result of the action of local arbitration units, one for each segment) the buffers Br(i) and Bl(i) interconnecting the different segments can also be considered as agents which submit requests for access.

For this purpose the arbitration unit 160 comprises within it a model of the buffers and of the segments, consisting of flag storage registers, whose state describes the state of the buffers and segments.

For example, a buffer is represented by a first flag, which, when set, indicates that the buffer is empty, and by a second flag, which, when set, indicates that the buffer is full; another flag indicates that a bus segment B(i) is occupied, and so on.

These data are used by the arbitration unit to control the data flow.

In particular, the flags indicating non-empty buffers may be considered, to all intents and purposes, as signals requesting access to a bus segment, generated inside the arbitration unit and arbitrated by the unit.

Since the arbitration of access to the segments of the bus is a collective process which takes into account the state of the various segments, the arbitration unit may be considered as consisting of N of access to one bus segment.

Consequently, the requests for access to a bus segment B(i) may originate from:

Br(i−1): right buffer

Bl(i): left buffer

P(i): processor or node connected to the segment B(i).

For the sake of simplicity and clarity, each access request is given the name of the agent which produces it.

P(i) is assigned a lower priority than the requests of the two buffers, to prevent obstruction of the flow of data already present in the bus segments or in the buffers.

However, to ensure that access to the segment by the buffers does not always take priority over the requests of the processor, the arbitration unit 160 implements an "unfairness" or forcing algorithm which always guarantees access to the segment after a predetermined number, for example 6, of accesses to the buffers have been granted.

A second criterion which is used consists in giving priority to an agent which has obtained access to the segment, this agent being granted priority access for as long as it requests it, even in subsequent arbitration cycles.

With this arrangement, it is unnecessary to separate the different accesses to the segment with recovery periods, and the use of the bus is optimized. It may also be noted that this criterion is the automatic consequence of the limitations imposed to prevent possible contention between the agents.

Another consequence of this approach, however, is that the agent which has taken possession of the bus tends to monopolize it to the detriment of the other agents.

To prevent this, the arbitration unit 160 implements a fairness algorithm, as a result of which, if an agent, despite access requests from another agent, has obtained access to the bus segment for a predetermined number of successive periods, for example 3, a mask is generated which prevents the recognition of further access requests from the same agent.

When the above criteria are not applicable, the buffers have the same priority, and, in order to settle access conflicts, the arbitration unit implements a round robin mechanism, to guarantee that, statistically, the two buffers have the same possibilities of access.

The round robin mechanism is of the global type; in other words, it operates not between the two buffer agents of a segment, but simultaneously among all the right buffers with respect to the l eft buffers.

This solution meets the criterion of guaranteeing that no one buffer takes priority over the others over a period of time, and al so promotes the simultaneous passage of a transaction from one bus segment to the next, under certain conditions, even if the buffer of arrival is temporarily occupied.

It is evident that, for a buffer agent to be able to place data in a bus segment, it is a prerequisite that the destination buffer is available to receive and store the data placed in the bus segment, and if it is not free there must be a certainty that it will become free in the same time period in which the data are placed in the bus segment.

For example, if the right buffers (or even only one sequence of them) are fully occupied, the buffer Br(i−1) can send a data item to the bus B(i) if the buffer Br(i) which is fully occupied can in turn send a data item to the bus B(i+1), and the buffer Br(i+1) which is fully occupied can in turn send a transaction to the bus B(i+2), and so on.

It is therefore possible to form a train of transactions which move simultaneously from one bus segment to the next, in the same direction, provided that all the right buffers have priority over the left buffers, or vice versa, at the same time.

This consideration emphasizes the fact that the different sub-arbitration units into which the arbitration unit 160 may be divided cannot ignore, in their arbitration process, the state of the other sub-arbitration units and the arbitration process which these are carrying on concurrently.

Preferred Embodiment of Arbitration Unit

Figure 3:
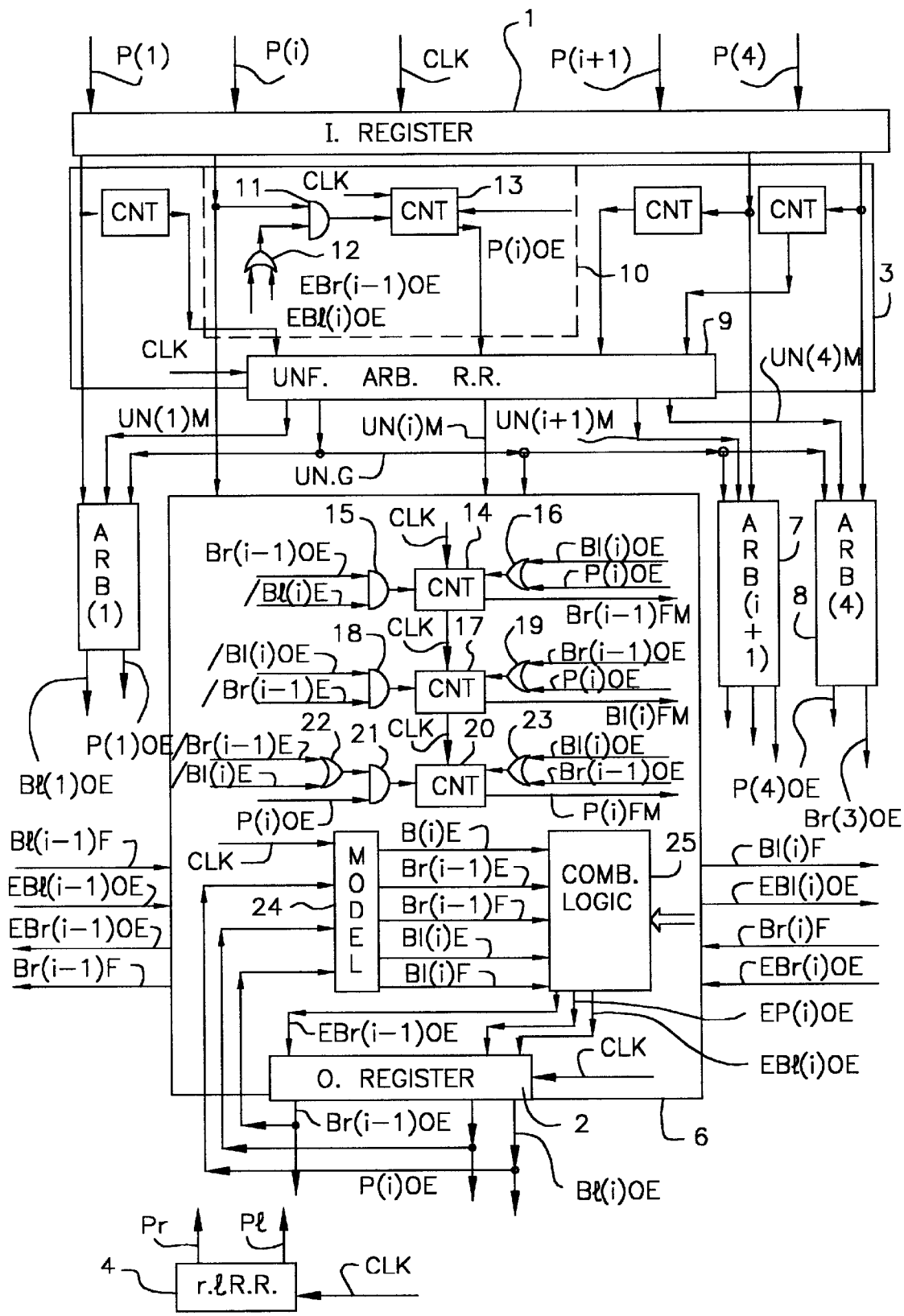
FIG. 3 is a detailed block diagram of a preferred embodiment of the arbitration and bus control unit for the system shown in FIG. 1.

The structure and operation of the arbitration unit 160 is clear from these premises; the unit is shown in the block diagram in FIG. 3 in a preferred embodiment of the many possible ones, which, solely by way of example, refers to a bus consisting of four segments.

The arbitration unit 160 comprises an input register I.REGISTER 1, timed by the clock signal CLK, an unfairness logic unit 3, a round robin logic unit (r.l.R.R.) 4 and four arbitration sub-units 5, 6, 7, 8, one for each bus segment, and each comprising an output register, of which only the register O.REGISTER 2 of the unit 6 is shown.

Since the units 5, 6, 7, 8 are structurally and functionally equivalent, only the unit 6 is shown in greater detail.

The arbitration architecture is of a conventional type:

At each pulse of the clock signal CLK, the input register 1 stores the external access requests from the processors P(1), P(i), P(i+1), P4 applied to its inputs, and submits them at its output to the unfairness logic unit 3 and to the arbitration sub-units 5, 6, 7, 8.

In the interval between one clock pulse CLK and the next, for example in a time interval of 10 ns, the different units carry out the arbitration, on the basis of signals exchanged between them, signals received from the unfairness unit 3, signals received from the round robin logic 4, and internally generated signals, and, at the clock pulse which terminates the time interval, load the result of the arbitration into the output register O.REGISTER 2, setting one and only one at a time of the signals Br(i−1)OE, P(i)OE, Bl(i)OE, which enable the right buffer Br(i−1), the processor P(i), and the left buffer Bl(i) respectively to access the bus segment B(i).

The unfairness logic unit 3 comprises four sections, each dedicated to one bus segment, and a common round robin unfairness logic 9.

Of the four subsections, which are identical to each other, only subsection 10, dedicated to the bus segment B(i), is shown in detail.

The subsection 10 comprises an AND gate 11, an OR gate 12 and a counter 13.

The AND gate 11 receives at a first input the signal P(i) from the output of the register 1, and at a second input (through the OR gate 12) the logical OR of a pair of signals EBr(i−1)OE and EBL(i)OE.

These two signals, generated by the arbitration sub-unit 6, indicate, when set, the outcome of the current arbitration, and correspond to the signals Br(i−1)OE and Bl(i)OE staticized at the end of the arbitration interval in the register O.REGISTER 2.

The output of the AND gate 11 is connected to an enabling input of the counter 13 which, when enabled, increments with each clock pulse.

For a counting value equal to a predetermined value, for example 6, the counter 13 sends an unfairness signal to the logic 9 and is inhibited.

The counter 13 is reset by the signal P(i)OE, at the output from the register 2, by which access to the segment B(i) by the processor P(i) is granted.

The unfairness round robin logic 9 arbitrates in a conventional cyclical way between the unfairness signals received from the different subsections to ensure that only one of the unfairness signals UN(1)M, UN(i)M, UN(i+1)M, UN(4)M is set at any time towards the arbitration sub-units.

It should be noted, without going into details, that the joint setting of a plurality of unfairness signals may cause a deadlock condition.

The logic 9 may conveniently also generate a global unfairness signal UN.G which is the logical OR of the signals UN(l)M, UN(i)M, UN(i+1)M, UN(4)M.

This signal is distributed and received by all the arbitration sub-units 5, 6, 7, 8.

A preferred embodiment of the round robin logic, among many possible embodiments, is described in European patent application No. 95830560.9.

The global round robin logic of the buffers (r.l.R.R. 4) is even simpler, and may consist of a simple flip-flop switched by the clock signal CLK, to set one of two signals Pr and Pl which cyclically grant priority to the right buffers Br(i) and to the left buffers Bl(i)

The two signals Pr and Pl are sent to all the arbitration sub-units 5, 6, 7, 8.

The sub-arbitration unit 6 will now be considered in more detail.

It comprises a right buffer fairness logic consisting essentially of a counter 14, an AND gate 15 and an OR gate 16, a left buffer fairness logic consisting essentially of a counter 17, an AND gate 18 and an OR gate 19, a processor fairness logic consisting essentially of a counter 20, an AND gate 21 and two OR gates 22, 23, a state machine 24 which as a whole is termed MODEL, to store or describe the state of the segment B(i) and of the associated right and left buffers, an arbitration combination logic 25 and the output register 0.REGISTER 2.

The MODEL logic 24, timed by the clock signal CLK, describes the state of the buffers Br(i−1), Bl(i) and of the bus segment B(i) in the course of each period of the clock signal as a result of the preceding state and of the operations set in each period with the setting in the output register 2 of one of the signals Br(i−1)OE, B1(i)OE and 2(i)OE which are applied to the input of the logic 24.

Essentially, the logic 24 produces the following signals at the output:

B(i)E, indicating, when set, that the bus segment B(i) is free.

Br(i−1)E, indicating, when set, that the buffer Br(i−1) is empty.

Br(i−1)F, indicating, when set, that the buffer Br(i−1) is full.

Bl(i)E, indicating, when set, that the buffer

Bl(i) is empty.

Bl(i)F, indicating, when set, that the buffer Bl(i) is full.

These signals are applied to the input of the combination logic 25 and some of them are also applied to the fairness logics and arbitration sub-units associated with the two bus segments adjacent to B(i).

The behaviour of the fairness logics is completely similar to that of the unfairness logic:

The counter 14 timed by the clock signal, incremented at each clock pulse if enabled by an input signal which is the AND (determined by the gate 15) of the two signals Br(i−1)OE and /Bl(i)OE.

Both here and subsequently the slash / has the logical significance of inversion or negation.

Consequently, it increments with each period of the clock signal in which access is granted to the right buffer, if at the same time the left buffer is not empty.

After a predetermined number of increments, for example three, the counter 14 is inhibited and a mask signal Br(i−1)FM is set at the output.

The counter 14 is reset by the setting of one or other of the two signals Bl(i)OE, P(i)OE applied to a reset input through the OR gate 16.

However, it could be reset simply by the setting of the signal Bl(i)OE, thus making the OR gate 16 super-fluous.

Similarly, the counter 17 increments at each pulse of the clock signal, if enabled by an input signal which is the AND (determined by the gate 18) of the two signals Bl(i)OE and /Br(i−1)E.

Consequently, it increments with each period of the clock signal in which access is granted to the left buffer and at the same time the right buffer is not empty.

After a predetermined number of increments, for example three, the counter 17 is inhibited and a mask signal Bl(i)FM is set at the output.

The counter 17 is reset by the setting of one or other of the two signals Br( i−1)OE, P(i)OE applied to a reset input through the OR gate 19, or simply by the setting of the signal Br(i−1)OE.

In the same way, the counter 20 increments at each pulse of the clock signal if enabled by an input signal which is the AND (determined by the gate 21) of the signals P(i)OE and one or other of the two signals /Br(i−1)E and /Bl(i)E supplied in OR mode by the gate 22.

Consequently, it increments with each period of the clock signal in which access is granted to the processor P(i) and at the same time at least one of the two buffers (right and left) is not empty.

After a predetermined number of increments, for example three, the counter 20 is inhibited and a mask signal P(i)FM is se t at the output.

The counter 20 is reset by the setting of one or other of the two signals Bl(i)OE or Br(i−1)OE applied to a reset input through the OR gate 23.

The combination logic 25 receives at its input the signal P(i), the output signals from the fairness (and unfairness) logics, the output signals from the state machine 24 (MODEL) and the output signals from the round robin logic 4.

It also receives from the adjacent arbitration sub-units 5 and 7 the state signals Bl(i−1)F, Br(i)F relating to the left and right buffer respectively of the adjacent bus segments on the left and right.

It also receives the signals generated, in the same arbitration cycle before this cycle is completed (one way of taking them into account in the same arbitration cycle), by the adjacent arbitration sub-units relating to the left and right buffers respectively, in other words the signals EBl(i−1)OE and EBr(i)OE.

The letter E prefixed to the signal name indicates that this signal is in the output from the combination logic and is not that which is loaded into the output register, in other words it is anticipated.

According to these signals, the combination logic 25 sets at the output one or other of the signals EBr(i−1)OE, EP(i)OE, EBl(i)OE which, when applied to the input of the output register 2, are loaded into the register at the time of the clock signal CLK which terminates the arbitration cycle and opens a new cycle.

The signals are set according to the following logical operations:

$$Br(i-1)OE=/Br(i-1)E*[/Bl(i)OE*/P(i)OE]*[Bl(i)\ E+Pr]*[/Br(i-1)FM+UN.G]*/UN(i)M*[/Br(i)F+EBr(i)OE]. \quad (1)$$

In other words, for Br(i−1)OE to be set, it is necessary:

1) that it is not empty ( /Br(i−1)E)
2) that there has been no access to the bus segment by other agents in the preceding cycle ( /Bl(i)OE*/P(i)OE) and therefore no recovery cycle is necessary
3) that, as a result of the round robin cyclic priority, the right buffer takes priority over the left, or the left buffer is empty and therefore has no reason to obtain access to the bus segment ( Bl(i)E+Pr)
4) that the fairness mask of the right buffer is not set, or that the global unfairness mask is set, a condition used to avoid possible deadlocks ( /Br(i−1)FM+UN.G)
5) that the unfairness mask of the processor connected to the same bus segment ( /UN(i)M) is not set (also used to avoid possible deadlocks)
6) that the destination buffer is not full, or that in the course of the same arbitration cycle it has been enabled to access the bus B(i+1) and therefore has an entry which is becoming free.

$$Bl(i)OE=/Bl(i)E*[/Br(i-1)OE*/P(i)OE]*[Br(i-1)E+Pl]*[/Bl(i)FM+UN.G]*/UN(i)M*[/Bl(i-1)F+EBl(i-1\ )OE]. \quad (2)$$

In other words, criteria equivalent to those considered above are applicable.

$$P(i)OE=P(i)*/Br(i-1)OE*/Bl(i)OE*/EBr(i-1)OE*\ /EBl(i)OE]*/P(i)FM*[/Br(i)F+EBr(i)OE]*[/Bl(i-1)F+EBl(i-1)OE] \quad (3)$$

In other words, for P(*i*)OE to be set, it is necessary:

1) that there is a request for access by the processor
2) that no access to the bus segment has been given in the preceding cycle to other agents (/Br(i−1)OE/Bl(i)OE), and therefore no recovery is necessary
3) that no access has to be given to the Br(i−1) and Bl(i) in the same arbitration cycle because of their higher priority
4) that the fairness mask of the processor does not have to be set
5) that both destination buffers Br(i) and Bl(i−1) must have a free entry or must be about to become free.

It is evident that the arbitration sub-units 5 and 8 which control access to the end segments of the bus are simplified with respect to those indicated previously, since the segments are provided with an input buffer and an output buffer at one end only.

Conversely, it must be remembered that the access enabling signals P(1)OE and P(4)OE are received with a delay equal to one clock signal period because of the effect of the buffer 167 (FIG. 1) and this fact has to be taken into account in equations (1) and (2), using, in place of the signal P(i)OE at the output of the output register of the arbitration sub-unit, a corresponding signal obtained from P(i)OE with a further buffering level in cascade connection.

The preceding description relates only to a preferred embodiment of the invention, but it is clear that many modifications may be made.

As stated previously, the FIFO buffers separating the different bus segments may have a depth variable from 1 to more entries.

Additionally, the arbitration criteria may be different from those described, although they would then be less efficient.

For example, it is possible to simplify the arbitration logic by providing as the basic principle the granting of access to each bus segment to the same agent which had obtained it previously, and the forcing of its release with the fairness mechanism.

To distribute access to the different agents it is possible to use a round robin algorithm of the global type which, instead of alternating access priority between the right and left buffers only, alternates it cyclically between the right buffers, the left buffers and the processors connected to the different segments, thereby avoiding the necessity of using an unfairness mechanism.

It is also possible to divide the arbitration unit 160 into a plurality of arbitration sub-units, each dedicated to one bus segment and decentralized spatially, intercommunicating through buffers for synchronizing and re-timing the different signals at the input and at the output of the arbitration sub-units.

In any case, although the latency time or the time required to execute a transaction, in other words to transfer data from one processor to another, through a number of segments of the system bus may (in case of access conflict between the processors and buffers) be greater than the time required in the case of a conventional bus, the possibility of executing a number of transactions simultaneously enables a higher global performance or throughput to be achieved.

This is so for two reasons: the bus can operate at a higher frequency, and a number of transactions can be executed in parallel, in other words with superimposition in time.

What is claimed is:

1. A computer system comprising:
   a multi-point communication bus;
   a plurality of units connected to the bus;
   and a timer unit to generate a periodic system clock signal, wherein the bus comprises a plurality of bus segments, each bus segment being concatenated with at least one adjacent bus segment through concatenation buffer registers to transfer a data item from the adjacent bus segment to the bus segment;
   the computer system further comprising an arbitration unit to control the simultaneous access, in a single period of the clock signal, to each bus segment of the plurality of bus segments such that a data item is transferred to each said bus segment by either a unit connected to the bus segment or by an adjacent bus segment via the concatenation buffer register.

2. Computer system according to claim 1, in which the said concatenation buffer registers include a bank of FIFO registers.

3. Computer system according to claim 1, in which the arbitration unit is connected to each unit and to each of the concatenation buffer registers by means of a dedicated line to send an access enabling signal, at least one of the dedicated lines comprising a plurality of portions of line concatenated by means of further buffer registers.

4. Computer system according to claim 1, in which the said timer unit is connected to a group of the said units and of the said buffer registers to supply the said clock signal to the said group, and at least one synchronization unit is connected to the said timer unit to receive the said clock signal and is connected to a further group of the said units and of the said buffer registers, to supply to the said further group a timing signal which is regenerated and synchronized with the said clock signal.

5. Computer system according to claim 4, in which the said at least one synchronization unit consists of a phase-locked loop.

6. Computer system according to claim 1, in which at least one of the said units consists of an interface bridge for connection to a local bus.

7. Computer system according claim 1, in which the said arbitration unit comprises, for each of the said bus segments, a state machine whose state represents the state of the said bus segment and of the buffer registers for concatenation of the said segment with at least one adjacent segment.

8. Computer system according to claim 7, in which the said arbitration unit comprises, for each of the said bus segments, a combination logic which permits consecutive accesses to the bus segment by a single agent, unit or concatenation buffer register, for a plurality of consecutive periods of the said clock signal, if the said agent has data to transfer and subject to the test of feasibility of each of the accesses by the said combination logic, and, for each of the said agents, comprises fairness logic circuits which, after a predetermined number of consecutive accesses, prevent further accesses by the same agent if another agent has data to transfer.

9. Computer system according to claim 8, in which the said arbitration unit assigns access priorities, for each segment, to the said concatenation buffer registers, if they are not empty, with respect to the said units connected to the segment, and in which the said arbitration unit comprises, for each segment, an unfairness logic to prevent further accesses to the said segment by the said concatenation buffer registers if the said units connected to the segment have submitted a request for access to the said arbitration unit, for access to the said segment, for a predetermined number of consecutive periods of the said clock signal.

10. Computer system according to claim 9, in which the said concatenation buffer registers of each bus segment comprise right buffers for transferring data in a first direction of concatenation of the said bus segments and left buffers for transferring data in the opposite direction of concatenation, and in which the said arbitration unit comprises a round robin logic to alternate cyclically the relative priority between the said right and left buffers in access to the said bus segments.

11. A computer system comprising:
   a multi-point communication bus comprising a plurality of bus segments, each one of said bus segments coupled to at least one adjacent bus segment by a concatenation buffer register which is configured to transfer data items between each said bus segment and said adjacent bus segment;
   a plurality of units connected to the bus, each said unit coupled to one of said plurality of bus segments;
   an arbitration unit coupled to each of said plurality of units and to each of said buffer registers; and
   a timer unit configured to generate a periodic system clock signal, wherein said arbitration unit is configured, in a single period of said clock signal, to simultaneously control a transfer of more than one data item between said units and said bus segments coupled to said units, and to simultaneously control via said bus registers a transfer of more than one data item between said bus segment and said adjacent bus segments.

12. The computer system according to claim 11, wherein said concatenation buffer registers include a bank of FIFO registers.

13. The computer system according to claim 11, wherein said arbitration unit is coupled to each said unit and to each said concatenation buffer register by means of a dedicated line to send an access enabling signal, wherein at least one of said dedicated lines comprises a plurality of portions of lines concatenated by means of further buffer registers.

14. The computer system according to claim 11, wherein said timer unit is connected to a group of said units and of said buffer register to supply said clock signal to said group, and at least one synchronization unit is connected to said timer unit to receive said clock signal, and is connected to a further group of said units and of said buffer registers to supply to said further group a timing signal which is regenerated and synchronized with said clock signal.

15. The computer system according to claim 14, wherein said at least one synchronization unit comprises a phase-locked loop.

16. The computer system according to claim 11, wherein said at least one of said units comprises an interface bridge for connection to a local bus.

17. The computer system according to claim 11, wherein said arbitration unit comprises, for each of said bus segments, a state machine whose state represents the state of said bus segment and of said buffer registers for concatenation of said segment with said at least one adjacent bus segment.

18. The computer system according to claim 17, wherein said arbitration unit comprises, for each of said bus segments, a combination logic which permits consecutive accesses to said bus segment by a single agent, unit or concatenation buffer register, for a plurality of consecutive periods of said clock signal, if said agent has data to transfer and subject to a test of feasibility of each of said accesses by said combination logic, and for each of said agents, comprises fairness logic circuits which, after a predetermined number of consecutive accesses, prevent further accesses by said agent if another agent has data to transfer.

19. The computer system according to claim 18, wherein said arbitration unit assigns access priorities, for each said bus segment, to said concatenation buffer registers, if they are not empty, with respect to said units connected to said segment, and in which said arbitration unit comprises, for each segment, an unfairness logic to prevent further accesses to said segment by said concatenation buffer registers if said units connected to said segment have submitted a request for access to said arbitration unit, for access to said segment, for a predetermined number of consecutive periods of said clock signal.

20. The computer system according to claim 19, wherein said concatenation buffer registers comprise right buffer for transferring data in a first direction of concatenation of said bus segments, and left buffers for transferring data in an opposite direction of concatenation, and wherein said arbitration unit comprises a round robin logic to alternate cyclically a relative priority between said right and left buffers in access to said bus segments.

* * * * *

UNITED STATES PATENT AND TRADEMARK OFFICE
CERTIFICATE OF CORRECTION

PATENT NO.     : 6,314,484 B1                                                    Page 1 of 1
DATED          : November 6, 2001
INVENTOR(S)    : Zulian It is certified that error appears in the above-identified patent and that said Letters Patent is hereby corrected as shown below:

<u>Title page,</u>
Item [30], the priority data should read as follows:

-- [30]         Foreign Application Priority Data
     Jul. 18, 1997    [EP]    EPO ............ 97830370 --

Signed and Sealed this

Tenth Day of September, 2002

Attest:

Attesting Officer

JAMES E. ROGAN
Director of the United States Patent and Trademark Office